United States Patent [19]

Klös-Hein et al.

[11] Patent Number: 4,967,036
[45] Date of Patent: Oct. 30, 1990

[54] ARRANGEMENT FOR CONTROLLING THE POSITION OF THE HEAD MOUNTING PLATE IN A MAGNETIC TAPE APPARATUS

[75] Inventors: Karl Klös-Hein, Wismar; Horst H. Rumpf, Herborn-Schönbach, both of Fed. Rep. of Germany

[73] Assignee: U.S. Philips Corporation, New York, N.Y.

[21] Appl. No.: 189,096

[22] Filed: May 2, 1988

[30] Foreign Application Priority Data

May 2, 1987 [DE] Fed. Rep. of Germany ....... 3714702

[51] Int. Cl.$^5$ .................. G11B 21/12; G11B 5/54; F16H 25/08; F16H 25/16
[52] U.S. Cl. .................................. 74/54; 74/96; 360/105; 360/137
[58] Field of Search ............... 360/105, 137; 74/54, 74/96

[56] References Cited

U.S. PATENT DOCUMENTS 4,649,446 3/1987 Deutsch et al. ................. 360/105
4,757,405 7/1988 Laudus ........................... 360/105

FOREIGN PATENT DOCUMENTS 2910343 4/1980 Fed. Rep. of Germany .
2919279 9/1980 Fed. Rep. of Germany .
3106166 1/1982 Fed. Rep. of Germany .

Primary Examiner—Robert S. Tupper
Attorney, Agent, or Firm—Brian J. Wieghaus

[57] ABSTRACT

The invention relates to a device for charging the position of a functional element in an electrical apparatus, in particular the head-mounting plate in a magnetic tape apparatus. The functional element being movable between a rest or stand-by position and two spaced-apart operating positions, i.e. a first and a second operating position. The functional element, which is spring-loaded towards its rest position, is held electromagnetically in the first operating position. In order to cooperate with a first electromagnet device in both operating positions, the functional element is provided with a first armature plate. A control device controlled by a second electromagnet device, sets the non-extended functional element to its first operating position after said element has been applied to the first electromagnet device and extends the functional element, while applied to the first electromagnet device, to set it to its second operating position.

14 Claims, 4 Drawing Sheets

ARRANGEMENT FOR CONTROLLING THE POSITION OF THE HEAD MOUNTING PLATE IN A MAGNETIC TAPE APPARATUS

BACKGROUND OF THE INVENTION

The invention relates to a device for changing the position of a functional element in an electrical apparatus, in particular the head-mounting plate in a magnetic-tape apparatus, the functional element being movable between a rest position and two-spaced apart operating positions, i.e. a first and a second operating position, and the functional element, which is spring loaded towards its rest position, being held electro-magnetically in the first operation position.

In magnetic-tape equipment intended for playing back tape cassettes, in particular Compact Cassettes, it is known to move the magnetic head relative to the magnetic tape in the cassette. For this purpose the magnetic head is arranged on a head-mounting plate, which is electro-mechanically movable. In a rest position the head-mounting plate is positioned in such a way that the magnetic head is completely withdrawn from the tape; in a first operating position or play position the head-mounting plate is positioned in such a way that the magnetic head is fully in contact with the tape; and in an intermediate position between the first operating position and the rest position the magnetic tape can be moved past the head substantially without any contact. This second operating position is referred to as the Cue or MSS position.

From DE-AS No. 29 10 343 it is known to keep the head-mounting plate in the rest position by means of a spring. If the head-mounting plate is to be set to the first operating position an electromagnet is energised to pull the head-mounting plate into the first operating position via a lever mechanism. From this first operating position the head-mounting plate can return to the rest position via a latching device at the location of the second operating position if the first magnet is de-energised and the latching device is released by a second electromagnet. If the second electromagnet does not release the latching device the head-mounting plate remains in the second operating position.

SUMMARY OF THE INVENTION

It is the object of the invention to construct a device of the type defined in the opening paragraph in such a way that the functional element can be set from a rest position to two operating positions and can be held in these positions by means of a minimal number of parts.

According to the invention, this object is achieved in that in order to cooperate with a first electromagnet device in both operating positions the functional element is extensible and is provided with a first armature plate, and in that there is provided a control device which is controlled by a second electromagnet device. The control device is constructed to set the non-extended functional element to its first operating position after said element has been applied to the first electromagnet device, and to extend the functional element, while applied to the first electromagnet device, to set it to its second operating position.

The control device thus dictates the position of the armature plate relative to the functional element. The two operating positions are obtained simply by extending or not extending the functional element with the aid of the control device. Suitably, in a further embodiment of the invention, the first armature plate is arranged on a slide which is movable relative to the functional element. The extension is then easy to realise.

In another embodiment of the invention, the control device comprises a pivotal arm adapted to control the slide and a second armature plate arranged on said arm and adapted to cooperate with the second electromagnet device. In a further embodiment of the invention, the slide comprises a nose adapted to cooperate with the arm to provide the extension of the functional element.

If the nose and the arm pass each other, the arm, in order to move past the nose, can either readily be moved sideways by said nose or the nose has to pivot the slide in order to move past the arm. During its pivotal movement the slide is moved towards the functional element. The two functions are obtained by energising or not energising the second electromagnet device. If the second magnet device is energised, the nose with the first armature plate has to give way. If the second magnet device is not energised, the arm gives way to the nose and the first armature plate. Whether the nose has to give way, and hence whether the first armature plate is pivoted, depends on the two operating positions or the extended or non-extended condition of the functional element. In a second embodiment of the invention, this is achieved in that the two positions of the slide of the first armature plate relative to the functional element are determined by the arm, one position being reached when the second armature plate is held by the second electromagnet device and the other position being reached when the second armature plate is released. Thus, it is achieved that in one position (Play) the functional element is moved to a position nearer the electromagnet device than in the other position (Fast Winding).

In order to impart to the first armature plate a fixed predetermined movement relative to the functional element, if the armature plate is moved from one position to the other, the slide, in a further embodiment of the invention, is guided on the functional element in guideways and by cooperation of the nose with the arm is movable from one position to the other position relative to the free end of the functional element by means of the guideways. In a further embodiment of the invention, a tension spring is arranged between the functional element of the slide to move the slide with the first armature plate into a rest position relative to the functional element. The slide and consequently the armature plate on this slide are automatically moved to the one or the other desired position relative to the functional element.

In a further embodiment of the invention, an electromagnet which can perform the desired functions, is constructed in such a way that the first electromagnet device and the second electromagnet device can be energised by a common field coil and the superimposed mutually insulated yokes of the electromagnet devices extend through the field coil. The use of only one electromagnet for the actuation of the control device and the first armature plate reduces the actuating current required to define the two positions of the first armature plate, and the only parts which are movable relative to the functional element being the two armature plates. Moreover, only a small number of parts are required and not much space is needed. A further embodiment of the invention provides a technical simplification in that the first electromagnet device and the second electromagnet device are constructed as holding magnets, which merely hold the armature plates applied to these devices. This results in a substantial reduction of the power required in operation.

In a further embodiment of the invention, a suitable construction of said electromagnet devices is obtained in that the yokes are U-shaped and are provided with polepieces, and in that the yokes each extend through the coil with one limb in opposite directions, in such a way that two polepieces are situated at each of the two axial coil ends, one pair of polepieces being adapted to cooperate with the first armature plate and the other pair of polepieces being adapted to cooperate with the second armature plate.

A further embodiment of the invention is characterized in that the first armature plate is arranged on a slide which is movable relative to the functional element.

In order to enable the slide carrying the first armature plate to be moved towards both positions a further embodiment of the invention, which is particularly suitable for a magnetic tape cassette apparatus, is characterized in that the functional element forms part of a U-shaped head-mounting plate, which carries the magnetic head on its base and which is mounted on a frame so as to be pivotable about a corner portion, a limb which cooperates with an actuating member engaging in a corner portion of the pivot and the other limb carrying the slide with the first armature plate at the location of its free end. The pivotal movement of the head-mounting plate enables the actuating movements between the rest position and the two operating positions to be obtained by means of an actuating mechanism which presses against one limb. This means that for pivoting the head-mounting plate into the rest position and the two operating positions only a rectilinearly operating actuating member is needed and that the two operating positions are secured by means of the electromagnet devices.

The invention will now be described in more detail, by way of example, with reference to the accompanying drawings. In the drawings:

DESCRIPTION OF THE PREFERRED EMBODIMENT

Figure 4:
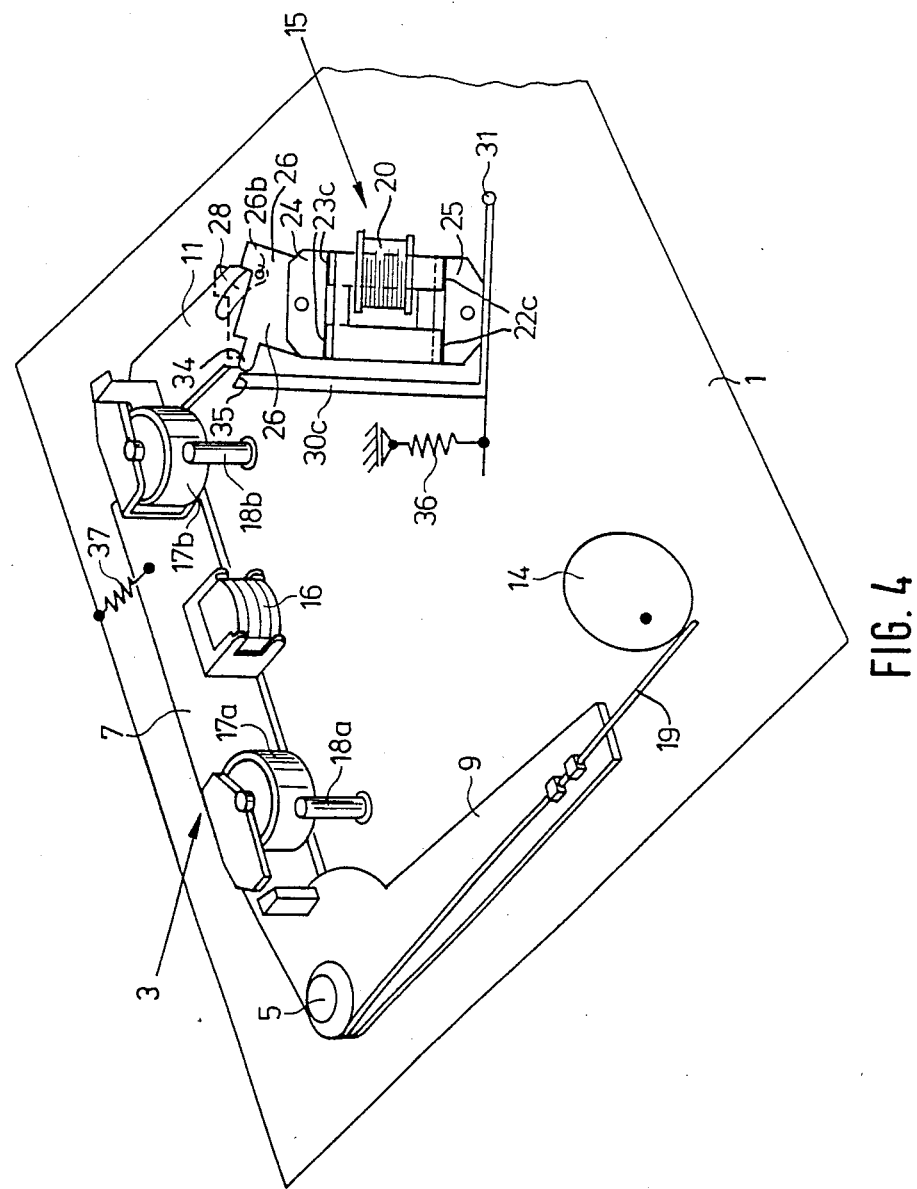

FIG. 4 shows the head-mounting plate in a position in which the magnetic head is slightly lifted off the magnetic tape but a first armature plate is positioned against the electromagnet device.

The drawing shows a deck plate 1, which is used as a frame for a magnetic-tape-cassette apparatus comprising a head-mounting plate 3 which is pivotable about an eccentric pivot 5. The head-mounting plate 3 is U-shaped and comprises limbs 9 and 11 which project in the same direction from the ends of its base 7. The limbs 9 and 11 thus form corner portions 12 and 13. The limb 9 is adapted to cooperate with an actuating member 14 and the limb 11 constitutes a functional element which is adapted to cooperate with a holding electromagnet device 15.

The base 7 of the head-mounting plate 3 carries a magnetic head 16 and pressure rollers 17a, 17b, which are pivotable relative to the base 7 in a manner which will not be described. The pressure rollers 17a and 17b can be applied to the capstans 18a and 18b to move the magnetic tape past the magnetic head 16 in one direction or the other.

The head-mounting plate is pivoted by means of an actuating member 14 depicted as an eccentric. This actuating member 14, which obviously may also be constructed as a rod, acts on a spring 19 attached to the limb 9. By means of the actuating member 14 the head-mounting plate 3 can be pivoted about the eccentric pivot 5, each time that said plate is actuated by the actuating member 14, which can rotate, for example, in a clockwise direction.

Figure 2:
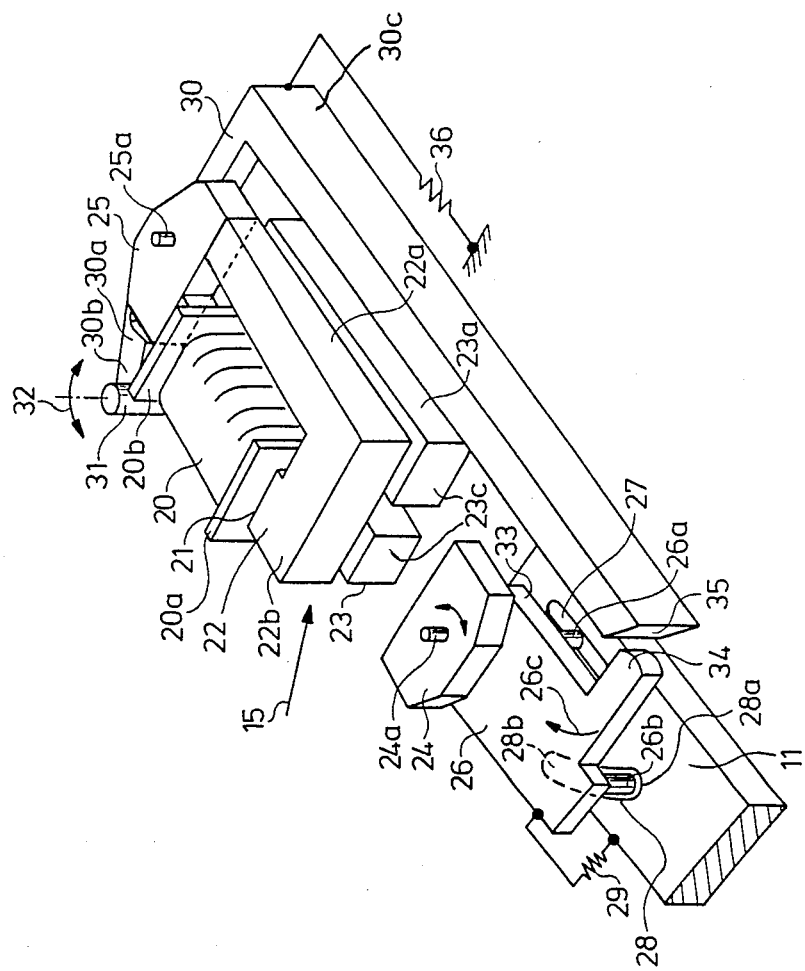
FIG. 2 shows an electromagnet device by means of which the head-mounting plate can be held, in particular, in two predetermined operating positions.

Reference is now made to FIG. 2, which diagrammatically shows a combined holding electromagnet device 15. The holding electromagnet device comprises a magnet coil 20, whose interior 21 is traversed by limbs of U-shaped magnetically insulated armatures of a first magnet device 22 and a second magnet device 23. The two armatures 22, 23 are superimposed in such a way that the relevant armature limbs 22a, 23a overlap one another. The yokes 22b, 23b are situated at facing coil ends 20a, 20b. The holding electromagnet device 15 is fixedly secured to the deck plate 1.

The free ends of the limbs form polepieces 23c and 22c which are adapted to cooperate with a first armature plate 24 and a second armature plate 25. By means of a pin 24a the first armature plate 24 is pivotally mounted on a slide 26. A guide pin 26a of said slide 26 engages in a guide slot 27 in the functional element 11. A guide pin 26b of the slide 26 can be guided in an arcuate slot 28 in the functional element 11. The arcuate slot 28 extends obliquely towards the combined holding electromagnet device 15 along an arcuate path whose first end portion extends transversely of the slot 27. A tension spring 29 ensures that the guide pin 26b normally engages the end portion 28a of the arcuate slot 28. In this position the slide 26 extends above and parallel to the functional element 11.

The second armature plate 25 is pivotally mounted on an arm 30 by means of a pin 25a. The arm 30 is L-shaped and has a short arm portion 30a, which also carries the second armature plate 25 and which at its free end 30b is pivotable about a pivot 31 in the direction indicated by a double arrow 32. A longer arm portion 30c extends parallel to the magnet coil 20 up to a lateral surface 33 of the slide 26, where it terminates in an inclined contact surface 35 before a nose 34 of the slide.

When the armature plates 24 and 25 have been applied to the polepieces 23c and 22c respectively they stick to these polepieces when the magnet coil 20 is energised. Thus, they can define two operating positions of the head-mounting plate 3 as long as the magnet coil 20 is energised. When the magnet coil 20 is deenergised both armature plates or only one of them are/is released, depending on whether both plates or only one plate have/has been applied, and a spring 37, which acts on the base 7 of the head-mounting plate 3, can pivot the head-mounting plate 3 counter-clockwise into a rest position.

Figure 1:
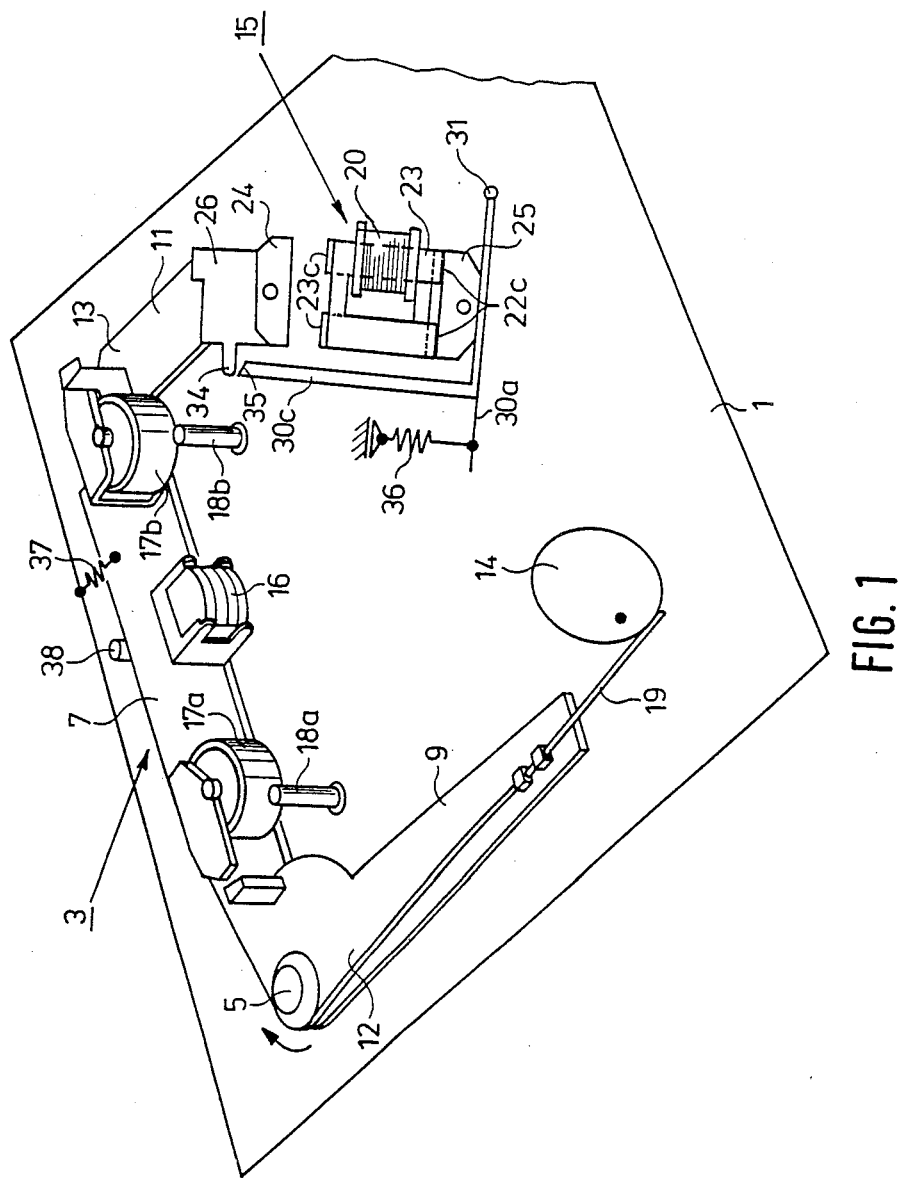
FIG. 1 shows part of magnetic tape apparatus comprising a deck plate and a head-mounting plate which is supported on said deck plate so as to be is pivotable about an eccentric pivot, the head-mounting plate being shown in its rest position.
Figure 3:
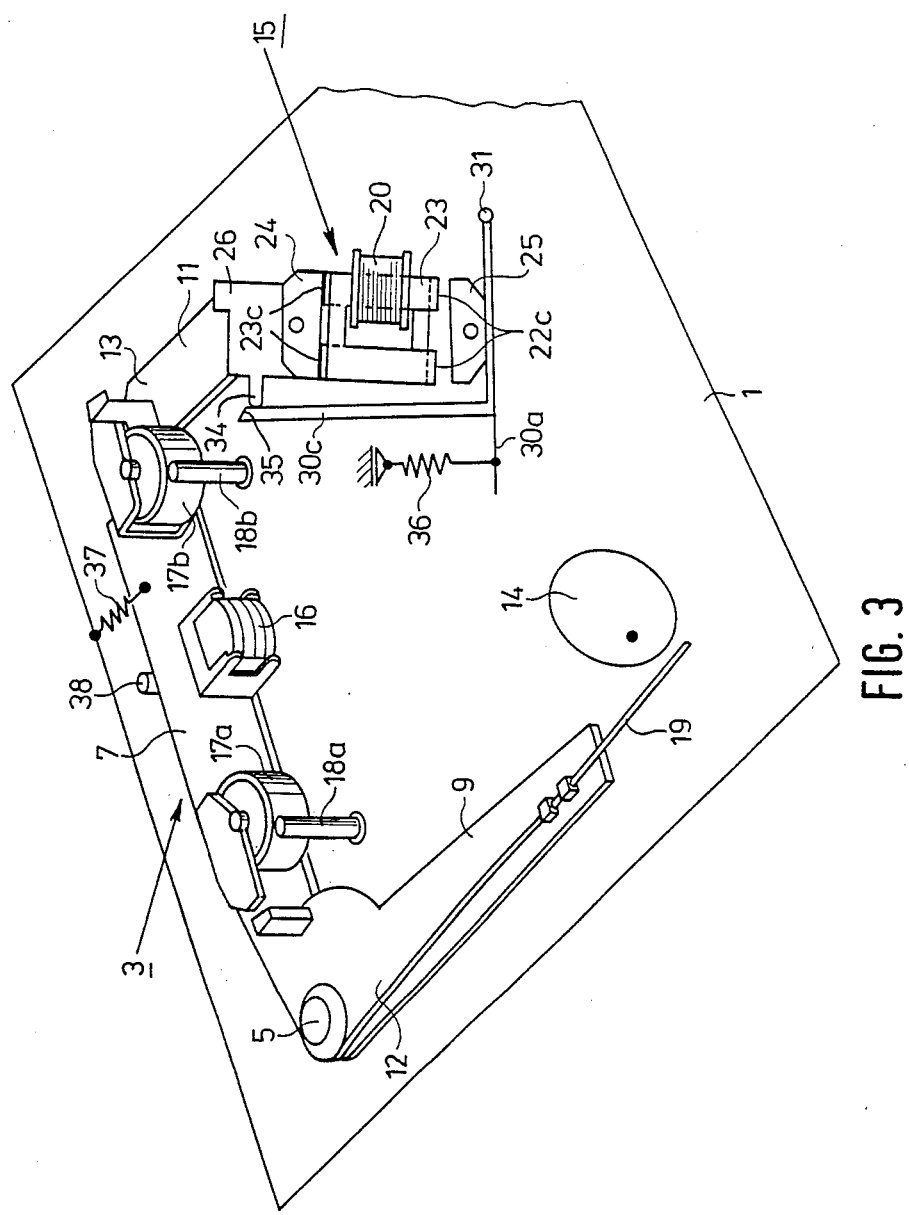
FIG. 3 shows the head-mounting plate in a position in which the electromagnet device holds the head-mounting plate in its pivoted position, namely in such a position far that the magnetic head occupies the play position.

How the head-mounting plate cooperates with the combined holding electromagnet device 15 will now be explained by describing the operation of this device. FIG. 1 shows the stand-by or rest position. The magnet coil 20 is de-energised and the armature plate 24 is clear of the polepieces 23c of the armature 23. The armature plate 25 is positioned against the polepieces 22c, because a tension spring 36 ensures that it is constantly urged against said polepieces. In the rest or stand-by position the tension spring 37 keeps the head-mounting plate pivoted counter-clockwise against a stop 38. Both the magnetic head 16 and the pressure-rollers 17a and 17b are clear of a magnetic tape, not shown, which tape moves between the pressure-roller/capstan pairs 17a 18a and 17b, 18b past the magnetic head 16. If the head-mounting plate should now be pivoted into and held in the play position, i.e. a first operating position, the revolving actuating member 14 acts against the wire spring 19, causing the head-mounting plate to be pivoted clockwise. The magnet coil 20 remains de-energised for the time being. When the head-mounting plate 3 is pivoted clockwise the functional element 11 is moved towards the holding electromagnet device 15. The nose 34 of the slide 26 abuts against the inclined surface 35 of the longer arm portion 30c. The tension spring 36 is so weak that the nose 34 presses the surface 35 and hence the longer arm portion 30c outwards in the counter-clockwise direction. The guide pin 26b remains in the end portion 28a. The functional element 11 guides the first armature plate against the polepieces (23c). Now the magnet coil 20 is energised, so that the armature plate 24 is held against the polepieces 23c (FIG. 3). In this way the head-mounting plate 3 is held in the play position, i.e. the first operating position. If the play mode has ended or if it is necessary to switch to a fast forward or reverse mode, the magnet coil 20 is de-energised. The tension spring 37 pivots the head-mounting plates counter-clockwise back into the rest or stand-by position, while the magnet coil 20 remains de-energised. From this rest or stand-by position it is possible to proceed to the position for fast-winding or again to the first operating (play) position. How the first operating position is reached has already been described in the foregoing. Now it will be described how the fast winding position, i.e. the second operating position, is reached and maintained.

In order to go to the fast-winding position (FIG. 4) the magnet coil 20 is energised. The second armature plate 25 is already positioned against the polepieces 22c. The mechanical tensioning or holding force provided by the tension spring 36 is now reinforced by a magnetic holding function provided by the polepieces 22c in conjunction with the armature plate 25. As a result of this it has become more difficult to pivot the longer arm portion 30c away in the counter-clockwise direction. The actuating member 14 makes one revolution and pivots the head-mounting plate 3 clockwise. The nose 34 of the slide 26 now cannot pivot the longer arm portion 30c away. This means that the nose 34 must give way to the surface 35 of the longer arm portion 30c. As a result of this, the guide pin 26b is moved towards the other end 28b of the arcuate slot 28. As a result of this, the guide pin 26a of the slide 26, which slide is simultaneously pivoted in the direction indicated by an arrow 26c, moves in the slot 27 towards the electromagnet holding device 15. This means that the functional element 11 is, in fact, extended in the direction of the holding electromagnet device 15. As a result of this extension the functional element 11 cannot move so far towards the holding electromagnet device 15 as described previously for the play position. The actuating member 14 then performs the same movement and deforms the spring 19 during its over-center movement. As a result of this, the head-mounting plate 3 remains slightly out of the play position and the magnetic tape is not firmly applied to the magnetic head 16. This is the position for fast forward or reverse winding. Moreover, the pressure rollers 17a and 17b are not applied to the capstans 18a, 18b.

If fast forward or reverse winding is to be stopped, the magnet coil 20 is de-energised. As a result of this, the armature plate 24 is released from the polepieces 23c. The tension spring 37 can pivot the head-mounting plate counter-clockwise back into the rest or standby position. The use of the construction just described makes it necessary to always return to the rest or stand-by position before the play or fast winding position can be reached. The principal advantage of the device is that only a very small number of parts are needed and, in particular, only one electromagnet. This results in a substantially simpler overall construction and a smaller number of parts.

Instead of one electromagnet the device 15 may comprise two electromagnets, i.e. one for the armature plate 24 and one for the armature plate 25. The device in accordance with the invention can also be employed to set other functional elements to two operating positions, for example a gear wheel in a drive mechanism. The device is also suitable for use in other electrical apparatuses. U.S. application Ser. No. 189,276, filed simultaneously with this application, discloses a device which enables the head mounting plate to be moved directly to the second operating position from the first operation position.

What is claimed is:

1. An electrical apparatus comprising a functional element mounted for movement between a rest position and first and second operating positions, said first operating position being spaced further from said rest position than said second operating position, means for moving said functional element from said rest position to said first operating position, biasing means for returning said functional element from said first and second operating positions to said rest position, and first electromagnetic holding means for electromagnetically holding said functional element in said first operating position, the improvement comprising:

a first armature plate mounted on said functional element for extension in the direction of said first electromagnetic holding means between first and second armature positions on said functional element, said second armature position being closer to said first electromagnetic holding means than said first armature position;

said positions being selected such that, with said first armature plate held by said first electromagnetic holding means, said functional element is in the first operating position when said first armature plate is in said first armature position and said functional element is in the second operating position when said first armature plate is in said second armature position;

biasing means for setting said first armature plate to said first armature position when said functional element is released from said first operating position and returned to said rest position, and extension means for extending said first armature plate to said second armature position for setting the functional element to said second operating position.

2. An apparatus as claimed in claim 1, wherein said functional element further comprises a slide extendable on said functional element between first and second slide positions corresponding to said first and second armature positions, and said extension means comprises second electromagnetic holding means, a pivotal arm, and a second armature plate arranged on the pivotal arm for being held by said second electromagnetic holding means.

3. An apparatus as claimed in claim 2, wherein said slide comprises a nose arranged for engaging said arm when said functional element is moved towards said first holding means, the position of said slide and said armature plate being controlled by said arm, said arm engaging said nose and moving said slide to the second slide position when said second armature plate is held by said second holding means during movement of said functional element towards said first holding means, said slide remaining in said first slide position when said arm and said second armature plate are not held by said second holding means, and when said functional element is released from said second operation position, said arm moving said slide to said first slide position.

4. An apparatus as claimed in claim 2, wherein said functional element and said slide comprise guides for guiding said slide between said first and second slide positions, said guides being shaped such that said slide moves from said first end position to said second end position when said arm is fixed against said nose when said first armature plate is moved against said first electromagnetic holding means.

5. An apparatus as claimed in claim 2, wherein said first and second electromagnetic means consist of a single electromagnet having an energizable field coil and a pair of yokes extending through said coil.

6. An apparatus as claimed in claim 5, wherein each yoke is U-shaped having two spaced limbs of equal length, the ends of each limb being a polepiece, a limb of each U-shaped yoke extending through said field coil in a direction opposite the other, the pole pieces of one yoke facing in one direction and the pole pieces of the other yoke facing in the opposite direction for holding a respective armature plate upon energization of said field coil.

7. An apparatus as claimed in claim 2 wherein said biasing means comprises a tension spring for biasing the slide with the first armature plate into said first slide position.

8. An apparatus as claimed in claim 7, wherein said first and second electromagnetic holding means consist of a single electromagnet having an energizable field coil and a pair of yokes extending through said coil.

9. An apparatus as claimed in claim 8, wherein each yoke is U-shaped having two spaced limbs of equal length, the ends of each limb being a polepiece, a limb of each U-shaped yoke extending through said field coil in a direction opposite the other, the pole pieces of one yoke facing in one direction and the pole pieces of the other yoke facing in the opposite direction for holding a respective armature plate upon energization of said field coil.

10. An apparatus as claimed in claim 9, wherein said arm is L-shaped, one arm portion carrying said second armature plate with said armature plate positioned for coacting with the polepieces of a respective yoke, and the other arm portion extending along the field coil and having an end portion for engaging said nose, said L-shaped arm being pivotable about a pivot arranged such that said end portion moves towards said nose when said second armature plate moves against said pole pieces, and biasing means for pivoting said arm with said second armature plate against said pole pieces.

11. An apparatus as claimed in claim 2, wherein said first and second electromagnetic holding means are constructed as holding magnets for holding said armature plates.

12. An apparatus as claimed in claim 2, wherein said slide comprises a nose arranged for engaging said arm when said functional element is moved towards said first holding means, the position of said slide and said first armature plate being controlled by said arm, said arm engaging said nose and moving said slide to the second slide position when said second armature plate is held by said second holding means during movement of said functional element towards said first holding means, said slide remaining in said first slide position when said arm and said second armature plate are not held by said second holding means, and when said functional element is released from said second operation position, said arm moving said slide to said first slide position.

13. An apparatus as claimed in claim 12, wherein said functional element and said slide comprise guides for guiding said slide between said first and second slide positions, said guides being shaped such that said slide moves from said first slide position to said second slide position when said arm is fixed against said nose when said first armature plate is moved against said first electromagnetic holding means.

14. An apparatus as claimed in claim 13, wherein said guides comprise said functional element having a straight slot and an arcuate slot, and said slide having a pin slidable in each slot, said slots and said pins being arranged such that said slide is moved to said second slide position when said functional element is moved towards said first holding means and said second armature plate is held by said second holding means to hold said arm against said nose.

* * * * *